United States Patent
Zhao (10) Patent No.: US 12,224,792 B2
(45) Date of Patent: Feb. 11, 2025

(54) AUDIO TRANSMISSION METHOD AND ELECTRONIC DEVICE

(71) Applicant: VIVO MOBILE COMMUNICATION CO., LTD., Dongguan (CN)

(72) Inventor: Deng Zhao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 163 days.

(21) Appl. No.: 17/945,048

(22) Filed: Sep. 14, 2022

(65) Prior Publication Data
US 2023/0006711 A1    Jan. 5, 2023

Related U.S. Application Data

(63) Continuation of application No. PCT/CN2021/080400, filed on Mar. 12, 2021.

(30) Foreign Application Priority Data

Mar. 16, 2020 (CN) ......................... 202010180932.4

(51) Int. Cl.
*H04B 1/7163* (2011.01)
*H04W 80/02* (2009.01)

(52) U.S. Cl.
CPC ........... *H04B 1/7163* (2013.01); *H04W 80/02* (2013.01)

(58) Field of Classification Search
CPC ....... H04B 1/7163; H04B 1/04; H04W 80/02; H04W 4/80; H04W 28/20; H04W 84/18; H04W 28/10; H04R 3/12; H04R 2420/07
See application file for complete search history.

(56) References Cited

U.S. PATENT DOCUMENTS

| | | | |
|---|---|---|---|
| 2008/0205664 A1 | 8/2008 | Kim et al. | |
| 2008/0226094 A1* | 9/2008 | Rutschman | H04M 1/6066 381/79 |
| 2008/0310332 A1* | 12/2008 | Hansen | H04W 12/50 370/310 |
| 2009/0198859 A1* | 8/2009 | Orishko | G06F 13/385 710/313 |

(Continued)

FOREIGN PATENT DOCUMENTS

| | | |
|---|---|---|
| CN | 101637012 A | 1/2010 |
| CN | 106937197 A | 7/2017 |
| CN | 107005800 A | 8/2017 |

(Continued)

OTHER PUBLICATIONS

International Search Report issued in corresponding International Application No. PCT/CN2021/080400, mailed May 26, 2021, 4 pages.

(Continued)

*Primary Examiner* — Sung S Ahn
(74) *Attorney, Agent, or Firm* — IPX PLLC (57) ABSTRACT

The present application provides an audio transmission method and an electronic device. When the audio transmission method is performed by a first electronic device, the audio transmission method includes: obtaining target audio; and transmitting an audio signal of the target audio to a first channel playback apparatus or a second channel playback apparatus of a second electronic device through an Ultra Wide Band transport protocol.

12 Claims, 4 Drawing Sheets

(56) References Cited

U.S. PATENT DOCUMENTS

2016/0164973 A1    6/2016   Kapoor et al.

FOREIGN PATENT DOCUMENTS

| CN | 110311758 A  | 10/2019 |
|----|--------------|---------|
| EP | 2119200 A1   | 11/2009 |
| JP | 2007067655 A | 3/2007  |
| JP | 2010523018 A | 7/2010  |
| JP | 2013504937 A | 2/2013  |

OTHER PUBLICATIONS

First Office Action issued in related Chinese Application No. 202010180932.4, mailed Jul. 29, 2022, 7 pages.
Extended European Search Report issued in related European Application No. 21770678.7, mailed Jun. 9, 2023, 7 pages.
Notice of Reasons for Refusal issued in related Japanese Application No. 2022-550852, mailed Aug. 8, 2023, 9 pages.

\* cited by examiner

AUDIO TRANSMISSION METHOD AND ELECTRONIC DEVICE

CROSS-REFERENCE TO RELATED APPLICATIONS

This application is a continuation of International Application No. PCT/CN2021/080400, filed Mar. 12, 2021, which claims priority to Chinese Patent Application No. 202010180932.4, filed Mar. 16, 2020. The entire contents of each of the above-referenced applications are expressly incorporated herein by reference.

TECHNICAL FIELD

The present application relates to the field of communication technologies, and in particular, to an audio transmission method and an electronic device.

BACKGROUND

With the rapid development of wireless communication technology and the gradual expansion of the market, radio transmission technology is applied more and more widely in wireless communications. Currently, when an electronic device transmits an audio through the Bluetooth, audio files with a large amount of data cannot be transmitted due to the limitation of transmission bandwidth, and can only be transmitted in an Advanced Audio Coding (AAC) and other compression-transmission-decompression manners. However, in the process of compression-transmission-decompression, the sound quality of the audio files may be damaged, which may affect the play effect of the audio files.

SUMMARY

Embodiments of the present application provide an audio transmission method and an electronic device.

According to a first aspect, an embodiment of the present application provides an audio transmission method, applied to a first electronic device, where the first electronic device is connected to a second electronic device through wireless connections, the second electronic device includes a first channel playback apparatus and a second channel playback apparatus, and the audio transmission method includes:
  obtaining target audio; and
  transmitting an audio signal of the target audio to the first channel playback apparatus or the second channel playback apparatus through an Ultra Wide Band transport protocol.

According to a second aspect, an embodiment of the present application further provides an audio transmission method, applied to a second electronic device, where the second electronic device is connected to a first electronic device through wireless connections, the second electronic device includes a first channel playback apparatus and a second channel playback apparatus, and the audio transmission method includes:
  receiving, through the first channel playback apparatus, the audio signal transmitted by the first electronic device; and
  transmitting a first channel audio signal in the audio signal to the second channel playback apparatus through the Ultra Wide Band transport protocol.

According to a third aspect, an embodiment of the present application further provides an electronic device, where the electronic device is a first electronic device, the electronic device is connected to a second electronic device through wireless connections, the second electronic device includes a first channel playback apparatus and a second channel playback apparatus, and the electronic device includes:
  an obtaining module, configured to obtain target audio; and
  a first transmission module, configured to transmit an audio signal of the target audio to the first channel playback apparatus or the second channel playback apparatus through an Ultra Wide Band transport protocol.

According to a fourth aspect, an embodiment of the present application further provides an electronic device, where the electronic device is a second electronic device, the electronic device is connected to a first electronic device through wireless connections, the electronic device includes a first channel playback apparatus and a second channel playback apparatus, and the electronic device further includes:
  a receiving module, configured to receive, through the first channel playback apparatus, the audio signal transmitted by the first electronic device; and
  a second transmission module, configured to transmit a first channel audio signal in the audio signal to the second channel playback apparatus through the Ultra Wide Band transport protocol.

According to a fifth aspect, an embodiment of the present application further provides an electronic device, including a processor, a memory, and a computer program stored in the memory and executable on the processor, and when the computer program is executed by the processor, steps of the audio transmission method according to the first aspect are implemented; or when the computer program is executed by the processor, steps of the audio transmission method according to the second aspect are implemented.

According to a sixth aspect, an embodiment of the present application further provides a computer-readable storage medium, storing a computer program, and when the computer program is executed by a processor, steps of the audio transmission method according to the first aspect are implemented; or when the computer program is executed by the processor, steps of the audio transmission method according to the second aspect are implemented.

In the embodiments of the present application, by obtaining target audio, the first electronic device transmits an audio signal of the target audio to a first channel playback apparatus or a second channel playback apparatus of the second electronic device through the Ultra Wide Band transport protocol. In this way, the first electronic device may transmit the audio signal by calling a transmission bandwidth of 27 Mbps in the Ultra Wide Band transport protocol, which increases a transmission rate of the audio signal, enables the first electronic device to transmit the audio with higher quality and higher bandwidth, so as to avoid damage to the sound quality of the audio.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

An embodiment of the present application provides an audio transmission method, and the audio transmission method is applied to a first electronic device, such as a mobile phone, a tablet computer, a computer, a wearable device, and the like. The first electronic device is connected to a second electronic device through wireless connections, such as a Bluetooth connection; the second electronic device includes a first channel playback apparatus and a second channel playback apparatus. For example, the second electronic device is an earphone, the first channel playback apparatus is a left earphone, and the second channel playback apparatus is a right earphone; or the second electronic device is an audio system, the first channel playback apparatus is a left-channel audio system, and the second channel playback apparatus is a right-channel audio system.

Figure 1:
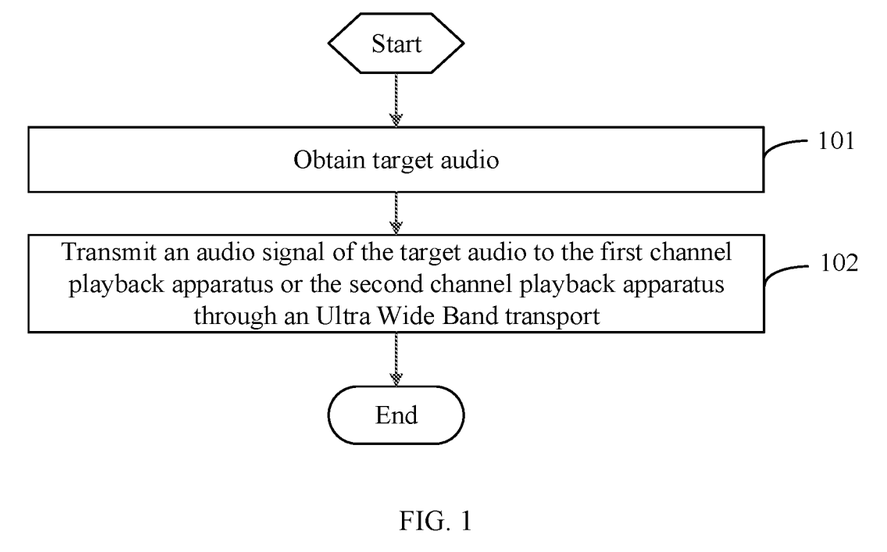
FIG. 1 is a flowchart of an audio transmission method according to an embodiment of the present application.

Referring to FIG. 1, FIG. 1 is a flowchart of an audio transmission method according to an embodiment of the present application. As shown in FIG. 1, the audio transmission method includes the following steps.

Step 101: Obtain target audio.

In some embodiments, the target audio may be an audio to be played or currently being played in the first electronic device. For example, in a case of receiving a touch operation of a user on a music play button, the first electronic device obtains the target audio; or in a case of receiving a touch operation of a user on a video play button, the first electronic device obtains the target audio.

Step 102. Transmit an audio signal of the target audio to the first channel playback apparatus or the second channel playback apparatus through an Ultra Wide Band transport protocol.

To better describe this solution, in the following implementation of the embodiment of the present application, an earphone is used as the second electronic device, a left earphone of the earphone is used as the first channel playback apparatus, and a right earphone of the earphone is used as the second channel playback apparatus for specific description.

In this embodiment of the present application, in a case that the first electronic device obtains the target audio, and the first electronic device establishes a wireless connection with an earphone, the first electronic device transmits the audio signal of the target audio to the left earphone or the right earphone of the earphone through the Ultra Wide Band (UWB) transport protocol.

It can be understood that the electronic device is usually provided with a Bluetooth chip, so as to transmit the audio signal to the earphone based on the Bluetooth transport protocol. However, a transmission bandwidth of Bluetooth is only 3 Mbps, and if an overhead of the transport protocol is also considered, an actual transmission rate of audio is even smaller, which limits the transmission of an audio file of the electronic device. A transmission speed supported by the Ultra Wide Band transport protocol has reached 27 Mbps. In this embodiment of the present application, the first electronic device can transmit the audio signal to the earphone based on the Ultra Wide Band transport protocol, so that the first electronic device can transmit the audio with higher quality and higher resolution requirements, to avoid sound quality damage caused by the low transmission rate, and ensure the audio transmission quality and playback effect.

As a specific implementation, step 102 may include:

calling media access control (MAC) and a physical layer (PHY) in the Ultra Wide Band transport protocol through an alternate medium access control/physical layer (AMP) controller and a protocol adaptation layer (PAL) in a Bluetooth transport protocol, and transmitting the audio signal of the target audio to the first channel playback apparatus and the second channel playback apparatus.

It should be noted that there is an Alternate Medium Access Control/Physical layer (AMP) controller in the Bluetooth transport protocol. The AMP controller is a secondary controller of a Bluetooth transmission system, and is a primary controller of a Basic Rate/Enhanced Data Rate (BR/EDR), which is used for searching, pairing, connection establishment, and connection maintenance; and when a Logical Link Control and Adaptation Protocol (L2CAP) connection between two BR/EDR Bluetooth devices is established, the AMP controller can detect an AMP controller of another device. When both Bluetooth devices have the AMP controller, the Bluetooth transmission system provides a mechanism for data flow to migrate from the primary controller to the secondary controller. Each AMP controller is provided with a Protocol Adaptation Layer (PAL). In a protocol stack layered architecture diagram, the PAL is above the Medium Access Control (MAC) and the Physical layer (PHY), and the function of the PAL is to map the Bluetooth protocol in the primary controller to the AMP controller.

In this embodiment of the present application, the first electronic device and the earphone are connected by Bluetooth. The first electronic device can use the AMP and the PAL as secondary transmission link control interfaces to call the MAC and the PHY in the 802.15.4a Ultra Wide Band transport protocol, so as to transmit audio signals without changing the Bluetooth transport protocol. Further, the audio signal of the target audio is transmitted to the left earphone or the right earphone. In this way, the first electronic device may transmit, on the basis of the already set Bluetooth chip and the existing Bluetooth transport protocol, the audio signal by calling a transmission bandwidth of 27 Mbps in the Ultra Wide Band transport protocol, which increases the transmission rate of the audio signal, enables the first electronic device to transmit the audio with higher quality and higher bandwidth, so as to avoid damage to the sound quality of the audio. In addition, the convenience of the first electronic device and the earphone for Bluetooth networking and pairing, as well as the compatibility for the Bluetooth earphone are retained.

In some embodiments, step 102 may further include:
transmitting, in a case that a transmission bandwidth required for transmitting the audio signal of the target audio is greater than a preset bandwidth, the audio signal of the target audio to the first channel playback apparatus or the second channel playback apparatus through the Ultra Wide Band transport protocol.

It can be understood that the first electronic device transmits, on the basis of the already set Bluetooth chip and the existing Bluetooth transport protocol, an audio signal by calling the MAC and the PHY in the Ultra Wide Band transport protocol through the AMP and the PAL. The first electronic device still retains the Bluetooth chip, and thus can still transmit the audio signal through the Bluetooth transport protocol.

It should be noted that the bandwidth of the Bluetooth transport protocol is 3 Mbps, while the transmission bandwidth of the Ultra Wide Band transport protocol is 27 Mbps. In this embodiment of the present application, after obtaining the target audio, the first electronic device may determine, based on a data size of the target audio, the transmission bandwidth required for transmitting the audio signal of the target audio. In a case that the required transmission bandwidth is greater than the preset bandwidth, the audio signal of the target audio is transmitted to the left earphone or the right earphone through the Ultra Wide Band transport protocol.

For example, the preset bandwidth is 3 Mbps, and when the transmission bandwidth required for transmitting the audio signal of the target audio is greater than 3 Mbps, it is no longer suitable to transmit the audio signal through the Bluetooth transport protocol. Then the audio signal may be transmitted through the Ultra Wide Band transport protocol, so as to ensure that the first electronic device can transmit the high-quality audio. In addition, there is no need to perform compression-transmission-decompression operations on the high-quality audio through Advanced Audio Coding (AAC), which avoids damage to the sound quality.

Further, after step 101, the method may further include:
transmitting, in a case that the transmission bandwidth required for transmitting the audio signal of the target audio is less than or equal to the preset bandwidth, the audio signal of the target audio to the first channel playback apparatus or the second channel playback apparatus through the Bluetooth transport protocol.

It can be understood that if the transmission bandwidth of the Bluetooth transport protocol is 3 Mbps, the preset bandwidth may be set to 3 Mbps; when the transmission bandwidth required for transmitting the audio signal of the target audio is less than or equal to 3 Mbps, the audio signal of the target audio is transmitted to the left earphone or the right earphone through the Bluetooth transport protocol; and when the transmission bandwidth required for transmitting the audio signal of the target audio is greater than 3 Mbps, the audio signal of the target audio is transmitted to the left earphone or the right earphone through the Ultra Wide Band transport protocol. In this way, the first electronic device can select different transmission modes to transmit the audio signal based on the transmission bandwidth required for transmitting the audio signal. This increases the audio transmission mode of the first electronic device, improves the transmission rate of audio signal, and enables the first electronic device to transmit the audio with higher quality and higher bandwidth.

Figure 1A:
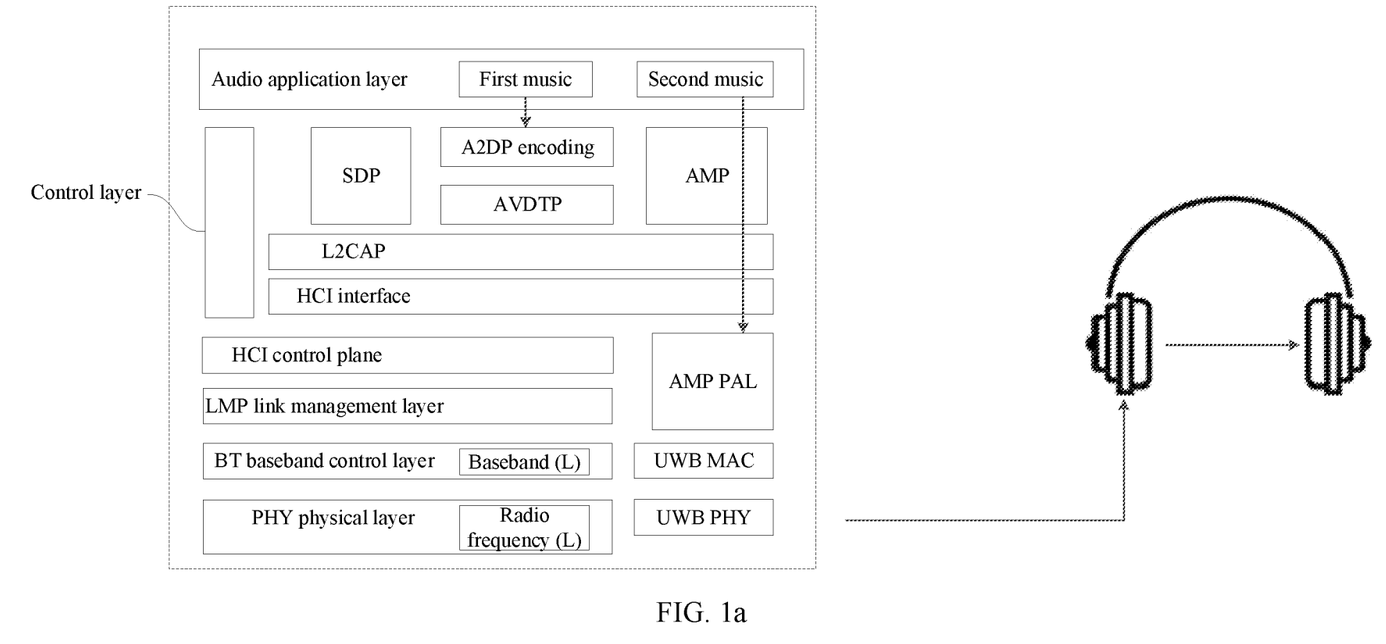
FIG. 1*a* is a schematic diagram of a scenario in which an audio transmission method provided in FIG. 1 is applied to an electronic device.

Referring to FIG. 1a, a first Bluetooth chip obtains the target audio (a first music or a second music) through an Audio application layer; and when a transmission bandwidth required for transmitting the audio signal of the target audio (the first music) is less than or equal to the preset bandwidth, the Advanced Audio Distribution Profile (A2DP) and the Audio/Video Distribution Transport Protocol (AVDTP) are used to encode the audio signal, and the encoded audio signal is transmitted to the left earphone or the right earphone of the earphone through a baseband unit and a radio frequency unit. It should be noted that the Bluetooth transport protocol also includes other protocols and control layers to follow, such as the Session Description Protocol (SDP), the AMP, the Logical Link Control and Adaptation Layer Protocol (L2CAP), the Human Computer Interaction (HCI) control plane, the Link Manager Protocol (LMP), the Bit Torrent (BT) baseband control layer, the Physical layer (PHY), and the like.

When the transmission bandwidth required for transmitting the audio signal of the target audio (the second music) is greater than the preset bandwidth, the MAC and the PHY in the Ultra Wide Band (UWB) transport protocol are called through the AMP and the PAL in the Bluetooth transport protocol, and the audio signal of the second music is transmitted to the left earphone or the right earphone. In this way, the audio transmission channel of the first electronic device is expanded, thereby improving the transmission quality of the audio file, avoiding damage to the sound quality of the audio file, and ensuring the sound quality effect of the audio file.

It should be noted that, after obtaining the target audio, the first electronic device decodes the target audio into a left-channel audio signal and a right-channel audio signal, and then the left-channel audio signal and the right-channel audio signal are combined and output to the left earphone or the right earphone through the Ultra Wide Band transport protocol. In other words, what the left earphone or the right earphone receives is the packaged left-channel audio signal and right-channel audio signal; if it is received by the left earphone, the left-channel audio signal is extracted therefrom, and the right-channel audio signal is transmitted to the right earphone, and if it is received by the right earphone, the right-channel audio signal is extracted therefrom, and the left-channel audio signal is transmitted to the left earphone.

Further, it is assumed that the left earphone receives the packaged left-channel audio signal and right-channel audio signal, and the left earphone extracts the left-channel audio signal therefrom. If the transmission bandwidth required for the right-channel audio signal is less than the preset bandwidth (for example, 3 Mbps), the left earphone may transmit the right-channel audio signal to the right earphone through the Bluetooth transport protocol; and if the transmission bandwidth required for the right-channel audio signal is greater than the preset bandwidth, the left earphone may transmit the right-channel audio signal to the right earphone through the Ultra Wide Band transport protocol. In other words, the earphone can also select an appropriate transmission mode to transmit the audio signal based on the transmission bandwidth required for the audio signal. The foregoing solution is also applicable to the second electronic device such as an audio system. Details are not repeated herein again.

An embodiment of the present application further provides another audio transmission method, and the audio transmission method is applied to the second electronic device. The second electronic device includes a first channel playback apparatus and a second channel playback apparatus. For example, the second electronic device is an earphone, the first channel playback apparatus is a left earphone, and the second channel playback apparatus is a right earphone; or the second electronic device is an audio system, the first channel playback apparatus is a left-channel audio system, and the second channel playback apparatus is a right-channel audio system. The second electronic device is connected to the first electronic device through wireless connections, such as a Bluetooth connection, and the first electronic device may be a device such as a mobile phone, a tablet computer, a computer, a wearable device, or the like that can transmit audio to the second electronic device.

Figure 2:
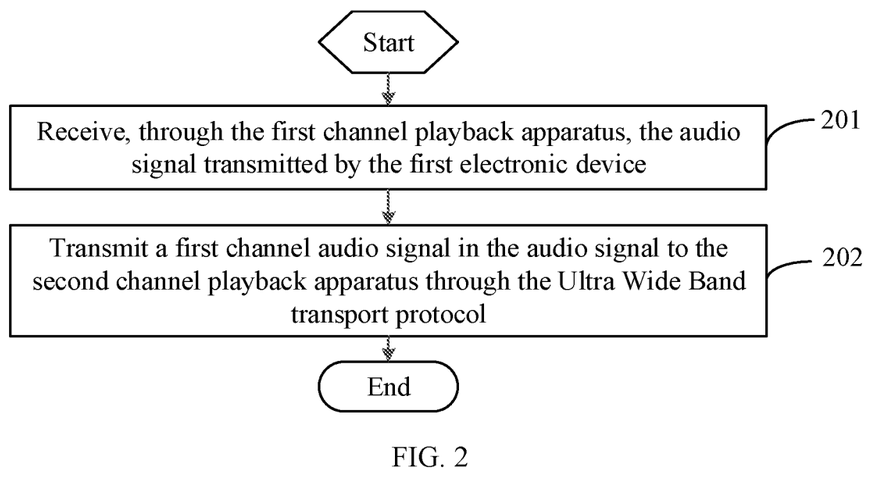
FIG. 2 is a flowchart of another audio transmission method according to an embodiment of the present application.

Referring to FIG. 2, FIG. 2 is a flowchart of an audio transmission method according to an embodiment of the present application. As shown in FIG. 2, the audio transmission method includes the following steps.

Step 201. Receive, through the first channel playback apparatus, the audio signal transmitted by the first electronic device.

The first channel playback apparatus is a left-channel playback apparatus or a right-channel playback apparatus. For example, the second electronic device is an earphone, and the first channel playback apparatus may be a left earphone or a right earphone. In a case of establishing a wireless connection with the first electronic device, the earphone receives the audio signal transmitted by the first electronic device through the left earphone or the right earphone.

In some embodiments, step 201 may include:
receiving, through the first channel playback apparatus, the audio signal transmitted by the first electronic device based on the Ultra Wide Band transport protocol.

In this embodiment of the present application, the second electronic device and the first electronic device are connected through Bluetooth, and the second electronic device is provided with a Bluetooth chip. The first electronic device may transmit an audio signal to the left earphone based on the Ultra Wide Band transport protocol. A specific transmission mode and principle may be referred to the description in the embodiment of FIG. 1. Details are not repeated in this embodiment of the present application.

The first electronic device may also transmit the audio signal to the left earphone based on the Bluetooth transport protocol.

Step 202. Transmit a first channel audio signal in the audio signal to the second channel playback apparatus through the Ultra Wide Band transport protocol.

The first channel playback apparatus is a left-channel playback apparatus, the second channel playback apparatus is a right-channel playback apparatus, and the first channel audio signal is a right-channel audio signal; or the first channel playback apparatus is a right-channel playback apparatus, the second channel playback apparatus is a left-channel playback apparatus, and the first channel audio signal is a left-channel audio signal.

In this step, the first channel playback apparatus calls media access control (MAC) and a physical layer (PHY) in the Ultra Wide Band transport protocol through an alternate medium access control/physical layer (AMP) controller and a protocol adaptation layer (PAL) in the Bluetooth transport protocol, and transmits the first channel audio signal in the audio signal to the second channel playback apparatus through the Ultra Wide Band transport protocol.

To better describe this solution, in the following implementation of this embodiment of the present application, an earphone is used as the second electronic device, a left earphone (namely, the left-channel playback apparatus) of the earphone is used as the first channel playback apparatus, and a right earphone (namely, the right-channel playback apparatus) of the earphone is used as the second channel playback apparatus for specific description.

In this embodiment of the present application, the earphone is provided with a Bluetooth chip. For example, the Bluetooth chip is disposed in the left earphone, and the left earphone can transmit the right-channel audio signal to the right earphone based on the Bluetooth transport protocol. There is an Alternate Medium Access Control/Physical layer (AMP) controller in the Bluetooth transport protocol. Each AMP controller is provided with a Protocol Adaptation Layer (PAL). In a protocol stack layered architecture diagram, the PAL is above the Medium Access Control (MAC) and the Physical layer (PHY), and the function of the PAL is to map the Bluetooth protocol in the primary controller to the AMP controller.

In this embodiment of the present application, after receiving the audio signal sent by the first electronic device, the left earphone can use the AMP and the PAL as secondary transmission link control interfaces to call the MAC and the PHY in the 802.15.4a Ultra Wide Band transport protocol, so as to transmit audio signals without changing the Bluetooth transport protocol. Further, the right-channel audio signal in the audio signal is transmitted to the right earphone. In this way, the earphone may transmit, on the basis of the already set Bluetooth chip and the existing Bluetooth transport protocol, the audio signal by calling a transmission bandwidth of 27 Mbps in the Ultra Wide Band transport protocol, which increases the transmission rate of the audio signal, enables the earphone to transmit the audio with higher quality and higher bandwidth, so as to avoid damage to the sound quality of the audio. In addition, convenience of the earphone and the first electronic device for Bluetooth networking and pairing is retained.

In some embodiments, step 202 may further include:
transmitting, in a case that the transmission bandwidth required for transmitting the first channel audio signal is greater than the preset bandwidth, the first channel audio signal to the second channel playback apparatus through the Ultra Wide Band transport protocol.

For example, the preset bandwidth is 3 Mbps, and when the transmission bandwidth required for transmitting the first channel audio signal (for example, the left-channel audio signal) is greater than 3 Mbps, it is no longer suitable to transmit the audio signal through the Bluetooth transport protocol. Then the audio signal may be transmitted through the Ultra Wide Band transport protocol, so as to ensure that the earphone can transmit the high-quality audio, which avoids sound quality damage and ensures the listening experience of the user.

In some embodiments, in a case that the transmission bandwidth required for transmitting the first channel audio signal is less than or equal to the preset bandwidth, the first channel audio signal is transmitted to the second channel playback apparatus through the Bluetooth transport protocol. It can be understood that if the transmission bandwidth of the Bluetooth transport protocol is 3 Mbps, the preset bandwidth may be set to 3 Mbps; and when the transmission bandwidth required for transmitting the first channel audio signal is less than or equal to 3 Mbps, the first channel playback apparatus transmits the first channel audio signal to the second channel playback apparatus through the Bluetooth transport protocol. In this way, the second electronic device can select different transmission modes for transmission based on the bandwidth required for transmitting the first channel audio signal. This increases the transmission modes for the second electronic device to transmit the audio signal, and ensures that the second electronic device can transmit the audio with higher quality and higher bandwidth.

As an optional implementation, the audio signal includes an indication signal, and the indication signal is used to instruct to transmit the first channel audio signal in the audio signal to the second channel playback apparatus through the Ultra Wide Band transport protocol.

In other words, the audio signal transmitted from the first electronic device to the second electronic device includes the indication signal, and the first channel playback apparatus transmits, based on the indication signal, the first channel audio signal to the second channel playback apparatus through the Ultra Wide Band transport protocol. In this way, the transmission mode of the audio signal between the first channel playback apparatus and the second channel playback apparatus is specified by the first electronic device, and the first channel playback apparatus does not need to determine the transmission bandwidth required for the first channel audio signal. No matter how great the transmission bandwidth required for the first channel audio signal is, it is transmitted based on the Ultra Wide Band transport protocol. Therefore, the sound quality of the first channel audio signal is prevented from being damaged, and the transmission rate between the first channel playback apparatus and the second channel playback apparatus is improved.

According to the technical solution provided in the embodiments of the present application, the second electronic device receives, through the first channel playback apparatus, the audio signal transmitted by the first electronic device, and transmits the first channel audio signal in the audio signal to the second channel playback apparatus through the Ultra Wide Band transport protocol. This increases the transmission rate of the audio signal, so that the second electronic device can transmit the audio with higher quality and higher bandwidth, avoids audio quality damage of the audio, and ensures efficient transmission of the high-quality audio.

Figure 3:
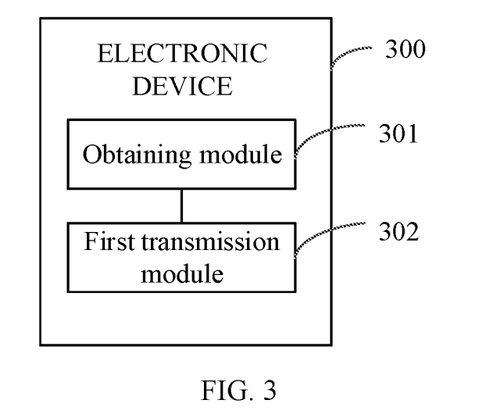
FIG. 3 is a structural diagram of an electronic device according to an embodiment of the present application.

Referring to FIG. 3, FIG. 3 is a structural diagram of an electronic device according to an embodiment of the present application. It should be noted that the electronic device is a first electronic device, the electronic device is connected to a second electronic device through wireless connections, the second electronic device includes a first channel playback apparatus and a second channel playback apparatus. As shown in FIG. 3, the electronic device 300 includes:
an obtaining module 301, configured to obtain target audio; and
a first transmission module 302, configured to transmit an audio signal of the target audio to the first channel playback apparatus or the second channel playback apparatus through an Ultra Wide Band transport protocol.

In some embodiments, the first transmission module 302 is further configured to:
call media access control (MAC) and a physical layer (PHY) in the Ultra Wide Band transport protocol through an alternate medium access control/physical layer (AMP) controller and a protocol adaptation layer (PAL) in a Bluetooth transport protocol, and transmit the audio signal of the target audio to the first channel playback apparatus and the second channel playback apparatus.

In some embodiments, the first transmission module 302 is further configured to:
transmit, in a case that a transmission bandwidth required for transmitting the audio signal of the target audio is greater than a preset bandwidth, the audio signal of the target audio to the first channel playback apparatus or the second channel playback apparatus through the Ultra Wide Band transport protocol.

In some embodiments, the first transmission module 302 is further configured to:
transmit, in a case that the transmission bandwidth required for transmitting the audio signal of the target audio is less than or equal to the preset bandwidth, the audio signal of the target audio to the first channel playback apparatus or the second channel playback apparatus through the Bluetooth transport protocol.

In some embodiments, the first electronic device and the second electronic device are connected through Bluetooth.

It should be noted that the electronic device 300 can implement processes of the audio transmission method embodiment shown in FIG. 1 and achieve a same technical effect. To avoid repetition, details are not described herein again.

In the embodiments of the present application, by obtaining target audio, the electronic device 300 transmits an audio signal of the target audio to a first channel playback apparatus or a second channel playback apparatus of the second electronic device through the Ultra Wide Band transport protocol. In this way, the electronic device 300 may transmit the audio signal by calling a transmission bandwidth of 27 Mbps in the Ultra Wide Band transport protocol, which increases a transmission rate of the audio signal, enables the electronic device 300 to transmit the audio with higher quality and higher bandwidth, so as to avoid damage to the sound quality of the audio.

Figure 4:
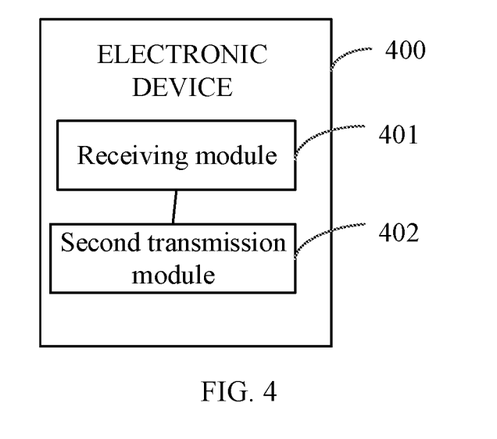
FIG. 4 is a structural diagram of another electronic device according to an embodiment of the present application.

Referring to FIG. 4, FIG. 4 is a structural diagram of another electronic device according to an embodiment of the present application. It should be noted that the electronic device is a second electronic device, the electronic device is connected to a first electronic device through wireless connections, the electronic device includes a first channel playback apparatus and a second channel playback apparatus. As shown in FIG. 4, the electronic device 400 includes:
a receiving module 401, configured to receive, through the first channel playback apparatus, the audio signal transmitted by the first electronic device; and
a second transmission module 402, configured to transmit a first channel audio signal in the audio signal to the second channel playback apparatus through the Ultra Wide Band transport protocol.

In some embodiments, the first channel playback apparatus is a left-channel playback apparatus, the second channel playback apparatus is a right-channel playback apparatus, and the first channel audio signal is a right-channel audio signal; or the first channel playback apparatus is a right-channel playback apparatus, the second channel playback apparatus is a left-channel playback apparatus, and the first channel audio signal is a left-channel audio signal.

In some embodiments, the audio signal includes an indication signal, and the indication signal is used to instruct to transmit the first channel audio signal in the audio signal to the second channel playback apparatus through the Ultra Wide Band transport protocol.

In some embodiments, the receiving module 401 is further configured to:
receive, through the first channel playback apparatus, the audio signal transmitted by the first electronic device based on the Ultra Wide Band transport protocol.

It should be noted that the electronic device 400 can implement processes of the audio transmission method embodiment shown in FIG. 2 and achieve a same technical effect. To avoid repetition, details are not described herein again.

In the embodiments of the present application, the electronic device 400 receives, through the first channel playback apparatus, the audio signal transmitted by the first electronic device, and transmits the first channel audio signal in the audio signal to the second channel playback apparatus through the Ultra Wide Band transport protocol. This increases the transmission rate of the audio signal, so that the electronic device 400 can transmit the audio with higher quality and higher bandwidth, avoids audio quality damage of the audio, and ensures efficient transmission of the high-quality audio.

Figure 5:
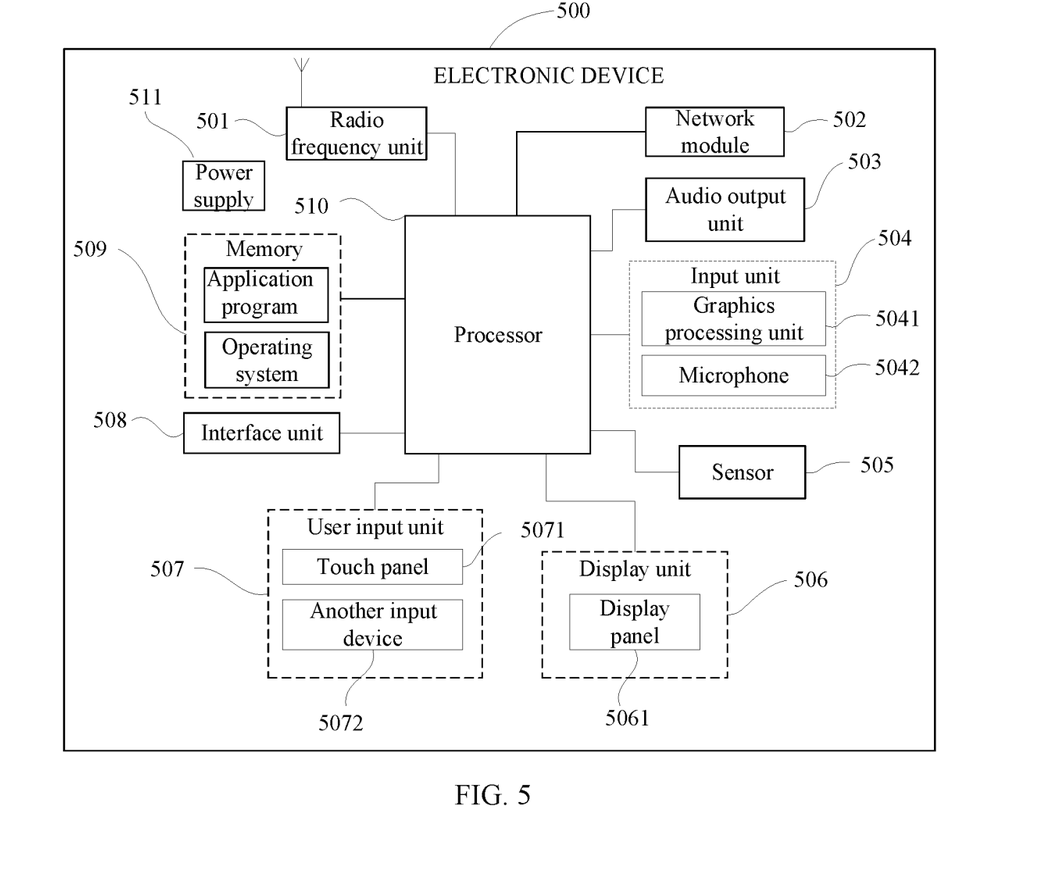
FIG. 5 is a structural diagram of another electronic device according to an embodiment of the present application.

Referring to FIG. 5, FIG. 5 is a structural diagram of another electronic device according to an embodiment of the present application. As shown in FIG. 5, the electronic device 500 includes but is not limited to: a radio frequency unit 501, a network module 502, an audio output unit 503, an input unit 504, a sensor 505, a display unit 506, a user input unit 507, an interface unit 508, a memory 509, a processor 510, a power supply 511, and other components. A person skilled in the art may understand that a structure of the electronic device shown in FIG. 5 constitutes no limitation on the electronic device, and the electronic device may include more or fewer components than those shown in the figure, or have a combination of some components, or have a different component arrangement. In this embodiment of the present application, the electronic device includes but is not limited to a mobile phone, a tablet computer, a notebook computer, a palmtop computer, an in-vehicle terminal, a wearable device, a pedometer, and the like.

In an implementation of the present application, the electronic device 500 can implement processes of the audio transmission method embodiment shown in FIG. 1 and achieve a same technical effect. In this implementation, the electronic device 500 is a first electronic device, the electronic device 500 is connected to a second electronic device through wireless connections, and the second electronic device includes a first channel playback apparatus and a second channel playback apparatus.

The processor 510 is configured to obtain target audio; and the radio frequency unit 501 is configured to transmit an audio signal of the target audio to the first channel playback apparatus or the second channel playback apparatus through an Ultra Wide Band transport protocol.

In some embodiments, the radio frequency unit 501 is further configured to:
  call media access control (MAC) and a physical layer (PHY) in the Ultra Wide Band transport protocol through an alternate medium access control/physical layer (AMP) controller and a protocol adaptation layer (PAL) in a Bluetooth transport protocol, and transmit the audio signal of the target audio to the first channel playback apparatus and the second channel playback apparatus.

In some embodiments, the radio frequency unit 501 is further configured to:
  transmit, in a case that a transmission bandwidth required for transmitting the audio signal of the target audio is greater than a preset bandwidth, the audio signal of the target audio to the first channel playback apparatus or the second channel playback apparatus through the Ultra Wide Band transport protocol.

In some embodiments, the radio frequency unit 501 is further configured to:
  transmit, in a case that the transmission bandwidth required for transmitting the audio signal of the target audio is less than or equal to the preset bandwidth, the audio signal of the target audio to the first channel playback apparatus or the second channel playback apparatus through the Bluetooth transport protocol.

In some embodiments, the electronic device 500 and the second electronic device are connected through Bluetooth.

In this implementation, by obtaining target audio, the electronic device 500 transmits an audio signal of the target audio to a first channel playback apparatus or a second channel playback apparatus of the second electronic device through the Ultra Wide Band transport protocol. In this way, the electronic device 500 may transmit the audio signal by calling a transmission bandwidth of 27 Mbps in the Ultra Wide Band transport protocol, which increases a transmission rate of the audio signal, enables the electronic device 500 to transmit the audio with higher quality and higher bandwidth, so as to avoid damage to the sound quality of the audio.

In another implementation of the present application, the electronic device 500 can implement processes of the audio transmission method embodiment shown in FIG. 2 and achieve a same technical effect. In this implementation, the electronic device 500 is a second electronic device, the electronic device 500 is connected to a first electronic device through wireless connections, and the audio output unit 503 includes a first channel playback apparatus and a second channel playback apparatus.

The radio frequency unit 501 is configured to receive, through the first channel playback apparatus, the audio signal transmitted by the first electronic device; and
  transmit a first channel audio signal in the audio signal to the second channel playback apparatus through the Ultra Wide Band transport protocol.

In some embodiments, the first channel playback apparatus is a left-channel playback apparatus, the second channel playback apparatus is a right-channel playback apparatus, and the first channel audio signal is a right-channel audio signal; or the first channel playback apparatus is a right-channel playback apparatus, the second channel playback apparatus is a left-channel playback apparatus, and the first channel audio signal is a left-channel audio signal.

In some embodiments, the audio signal includes an indication signal, and the indication signal is used to instruct to transmit the first channel audio signal in the audio signal to the second channel playback apparatus through the Ultra Wide Band transport protocol.

In some embodiments, the radio frequency unit 501 is further configured to receive, through the first channel playback apparatus, the audio signal transmitted by the first electronic device based on the Ultra Wide Band transport protocol.

In this implementation, the electronic device 500 receives, through the first channel playback apparatus, the audio signal transmitted by the first electronic device, and transmits the first channel audio signal in the audio signal to the second channel playback apparatus through the Ultra Wide Band transport protocol. This increases the transmission rate of the audio signal, so that the electronic device 500 can transmit the audio with higher quality and higher bandwidth, avoids audio quality damage of the audio, and ensures efficient transmission of the high-quality audio.

It should be understood that, in this embodiment of the present application, the radio frequency unit 501 may be configured to receive and send information or receive and send a signal in a call process. In some embodiments, after downlink data from a base station is received, the processor 510 processes the downlink data. In addition, uplink data is sent to the base station. Usually, the radio frequency unit 501 includes but is not limited to an antenna, at least one amplifier, a transceiver, a coupler, a low noise amplifier, a duplexer, or the like. In addition, the radio frequency unit 501 may also communicate with a network and other devices through a wireless communication system.

The electronic device 500 provides wireless broadband Internet access for the user by using the network module 502, for example, helping the user to send and receive an e-mail, browse a web page, and access streaming media.

The audio output unit 503 may convert audio data received by the radio frequency unit 501 or the network module 502 or stored in the memory 509 into an audio signal and output the audio signal as a sound. Moreover, the audio output unit 503 can further provide audio output related to a specific function performed the electronic device 500 (for example, call signal receiving sound and message receiving sound). The audio output unit 503 includes a speaker, a buzzer, a telephone receiver, and the like.

The input unit 504 is configured to receive audio or radio frequency signals. The input unit 504 may include a Graphics Processing Unit (GPU) 5041 and a microphone 5042. The graphics processing unit 5041 processes image data of a static image or a video obtained by an image capturing apparatus (for example, a camera) in a video capturing mode or an image capturing mode. A processed image frame may be displayed on the display unit 506. The image frame processed by the graphics processing unit 5041 can be stored in the memory 509 (or another computer readable storage medium) or sent via the radio frequency unit 501 or the network module 502. The microphone 5042 may receive sound and can process such sound into audio data. The processed audio data may be converted in a call mode into a format that can be sent by the radio frequency unit 501 to a mobile communication base station for outputting.

The electronic device 500 further includes at least one sensor 505, for example, a light sensor, a motion sensor, and another sensor. In some embodiments, the light sensor includes an ambient light sensor and a proximity sensor. The ambient light sensor may adjust brightness of a display panel 5061 according to ambient light brightness. The proximity sensor may switch off the display panel 5061 and/or backlight when the electronic device 500 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 505 may further include a fingerprint sensor, a pressure sensor, an iris sensor, a molecular sensor, a gyroscope, a barometer, a hygrometer, a thermometer, an infrared sensor, or the like. Details are not described herein again.

The display unit 506 is configured to display information entered by the user or information provided for the user. The display unit 506 may include the display panel 5061, and the display panel 5061 may be configured in a form of a Liquid Crystal Display (LCD), an Organic Light-Emitting Diode (OLED), or the like.

The user input unit 507 may be configured to: receive entered digital or character information, and generate key signal input related to a user setting and function control of the electronic device 500. In some embodiments, the user input unit 507 includes a touch panel 5071 and another input device 5072. The touch panel 5071 is also referred to as a touchscreen, and may collect a touch operation performed by a user on or near the touch panel 5071 (for example, an operation performed by a user on the touch panel 5071 or near the touch panel 5071 by using any proper object or accessory, for example, a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 510, and receives and executes a command sent by the processor 510. In addition, the touch panel 5071 may be implemented in various types such as a resistor, a capacitor, an infrared ray, or a surface acoustic wave. The user input unit 507 may include another input device 5072 in addition to the touch panel 5071. In some embodiments, the other input devices 5072 may include but are not limited to: a physical keyboard, a function key (such as a volume control key, a switch key), a trackball, a mouse, and a joystick. Details are not described herein.

Further, the touch panel 5071 may cover the display panel 5061. When detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. Although the touch panel 5071 and the display panel 5061 in FIG. 5 are configured as two independent components to implement input and output functions of the electronic device 500, in some embodiments, the touch panel 5071 and the display panel 5061 may be integrated to implement the input and output functions of the electronic device 500. Details are not limited herein.

The interface unit 508 is an interface for connecting an external apparatus with the electronic device 500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive an input (for example, data information and power) from an external apparatus and transmit the received input to one or more elements in the electronic device 500 or may be configured to transmit data between the electronic device 500 and the external apparatus.

The memory 509 may be configured to store a software program and various data. The memory 509 may mainly include a program storage area and a data storage area. The program storage area may store an operating system, an application program required by at least one function (for example, a sound play function or an image display function), or the like. The data storage area may store data (for example, audio data or an address book) or the like created based on use of a mobile phone. In addition, the memory 509 may include a high-speed random access memory or a nonvolatile memory, for example, at least one disk storage device, a flash memory, or other volatile solid-state storage devices.

The processor 510 is a control center of the electronic device 500, connects all parts of the entire electronic device 500 by using various interfaces and lines, and performs various functions of the electronic device 500 and data processing by running or executing a software program and/or a module that are/is stored in the memory 509 and by calling data stored in the memory 509, thereby performing overall monitoring on the electronic device 500. The processor 510 may include one or more processing units. In some embodiments, the processor 510 may be integrated with an application processor and a modem processor. The application processor mainly processes an operating system, a user interface, an application program, and the like. The modem processor mainly processes wireless communication. It can be understood that, for example, the modem processor may not be integrated into the processor 510.

The electronic device 500 may further include the power supply 511 (for example, a battery) supplying power to each component. In some embodiments, the power supply 511 may be logically connected to the processor 510 by using a power management system, so as to implement functions such as charging management, discharging management, and power consumption management by using the power management system.

In addition, the electronic device 500 includes some functional modules not shown. Details are not described herein again.

An embodiment of the present application further provides an electronic device, including a processor, a memory, and a computer program stored in the memory and executable on the processor. When the computer program is executed by the processor, processes of the audio transmission method embodiment are implemented, and a same technical effect can be achieved. To avoid repetition, details are not described herein again.

An embodiment of the present application further provides a computer-readable storage medium. The computer-readable storage medium stores a computer program, where when the computer program is executed by a processor, processes of the audio transmission method embodiment are implemented, and a same technical effect can be achieved. To avoid repetition, details are not described herein again. The computer readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. Based on such an understanding, the technical solutions of the present application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. An audio transmission method, performed by a first electronic device that is connected to a second electronic device through wireless connections, wherein the second electronic device comprises a first channel playback apparatus and a second channel playback apparatus, and the audio transmission method comprises:
    obtaining target audio;
    decoding the target audio into a first channel audio signal and a second channel audio signal; and
    transmitting an audio signal of the target audio to the first channel playback apparatus through an Ultra Wide Band transport protocol or a Bluetooth transport protocol, wherein the audio signal comprises an indication signal and a combination of the first channel audio signal and the second channel audio signal, wherein the indication signal instructs the first channel playback apparatus to transmit the first channel audio signal to the second channel playback apparatus through the Ultra Wide Band transport protocol.

2. The audio transmission method according to claim 1, wherein the transmitting an audio signal of the target audio to the first channel playback apparatus through an Ultra Wide Band transport protocol comprises:
    calling media access control (MAC) and a physical layer (PHY) in the Ultra Wide Band transport protocol through an alternate medium access control/physical layer (AMP) controller and a protocol adaptation layer (PAL) in the Bluetooth transport protocol; and
    transmitting the audio signal of the target audio to the first channel playback apparatus.

3. The audio transmission method according to claim 1, wherein the transmitting an audio signal of the target audio to the first channel playback apparatus comprises:
    transmitting, when a transmission bandwidth required for transmitting the audio signal of the target audio is greater than a preset bandwidth, the audio signal of the target audio to the first channel playback apparatus through the Ultra Wide Band transport protocol.

4. The audio transmission method according to claim 3, wherein the transmitting an audio signal of the target audio to the first channel playback apparatus:
    transmitting, when the transmission bandwidth required for transmitting the audio signal of the target audio is less than or equal to the preset bandwidth, the audio signal of the target audio to the first channel playback apparatus or the second channel playback apparatus through the Bluetooth transport protocol.

5. An electronic device, wherein the electronic device is a first electronic device connected to a second electronic device through wireless connections, wherein the second electronic device comprises a first channel playback apparatus and a second channel playback apparatus, wherein the electronic device comprises:
- a memory storing a computer program; and
- a processor coupled to the memory and configured to execute the computer program, wherein the computer program, when executed by the processor, causes the processor to perform operations comprising:
  - obtaining target audio;
  - decoding the target audio into a first channel audio signal and a second channel audio signal; and
  - transmitting an audio signal of the target audio to the first channel playback apparatus through an Ultra Wide Band transport protocol or a Bluetooth transport protocol, wherein the audio signal comprises an indication signal and a combination of the first channel audio signal and the second channel audio signal, wherein the indication signal instructs the first channel playback apparatus to transmit the first channel audio signal to the second channel playback apparatus through the Ultra Wide Band transport protocol.

6. The electronic device according to claim 5, wherein the transmitting an audio signal of the target audio to the first channel playback apparatus through an Ultra Wide Band transport protocol comprises:
- calling media access control (MAC) and a physical layer (PHY) in the Ultra Wide Band transport protocol through an alternate medium access control/physical layer (AMP) controller and a protocol adaptation layer (PAL) in the Bluetooth transport protocol; and
- transmitting the audio signal of the target audio to the first channel playback apparatus.

7. The electronic device according to claim 5, wherein the transmitting an audio signal of the target audio to the first channel playback apparatus comprises:
- transmitting, when a transmission bandwidth required for transmitting the audio signal of the target audio is greater than a preset bandwidth, the audio signal of the target audio to the first channel playback apparatus through the Ultra Wide Band transport protocol.

8. The electronic device according to claim 7, wherein the transmitting an audio signal of the target audio to the first channel playback apparatus:
- transmitting, when the transmission bandwidth required for transmitting the audio signal of the target audio is less than or equal to the preset bandwidth, the audio signal of the target audio to the first channel playback apparatus or the second channel playback apparatus through the Bluetooth transport protocol.

9. A non-transitory computer-readable storage medium, storing a computer program to be executed by a processor of a first electronic device that is connected to a second electronic device through wireless connections, wherein the second electronic device comprises a first channel playback apparatus and a second channel playback apparatus, wherein the computer program, when executed by the processor of the first electronic device, causes the processor to perform operations comprising:
- obtaining target audio;
- decoding the target audio into a first channel audio signal and a second channel audio signal; and
- transmitting an audio signal of the target audio to the first channel playback apparatus through an Ultra Wide Band transport protocol or a Bluetooth transport protocol, wherein the audio signal comprises an indication signal and a combination of the first channel audio signal and the second channel audio signal, wherein the indication signal instructs the first channel playback apparatus to transmit the first channel audio signal to the second channel playback apparatus through the Ultra Wide Band transport protocol.

10. The non-transitory computer-readable storage medium according to claim 9, wherein the transmitting an audio signal of the target audio to the first channel playback apparatus through an Ultra Wide Band transport protocol comprises:
- calling media access control (MAC) and a physical layer (PHY) in the Ultra Wide Band transport protocol through an alternate medium access control/physical layer (AMP) controller and a protocol adaptation layer (PAL) in the Bluetooth transport protocol; and
- transmitting the audio signal of the target audio to the first channel playback apparatus.

11. The non-transitory computer-readable storage medium according to claim 9, wherein the transmitting an audio signal of the target audio to the first channel playback apparatus comprises:
- transmitting, when a transmission bandwidth required for transmitting the audio signal of the target audio is greater than a preset bandwidth, the audio signal of the target audio to the first channel playback apparatus through the Ultra Wide Band transport protocol.

12. The non-transitory computer-readable storage medium according to claim 11, wherein the transmitting an audio signal of the target audio to the first channel playback apparatus comprises:
- transmitting, when the transmission bandwidth required for transmitting the audio signal of the target audio is less than or equal to the preset bandwidth, the audio signal of the target audio to the first channel playback apparatus or the second channel playback apparatus through the Bluetooth transport protocol.

* * * * *